(12) United States Patent
Cui et al.

(10) Patent No.: US 10,041,572 B2
(45) Date of Patent: Aug. 7, 2018

(54) RADIALLY ENGAGING COUPLING SYSTEM

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

( * ) Notice: Subject to any disclaimer, the term of this patent is extended or adjusted under 35 U.S.C. 154(b) by 452 days.

(21) Appl. No.: 14/799,098

(22) Filed: Jul. 14, 2015

(65) Prior Publication Data

US 2017/0016519 A1     Jan. 19, 2017

(51) Int. Cl.
| | |
|---|---|
| *F16H 25/14* | (2006.01) |
| *F16B 21/02* | (2006.01) |
| *F16B 37/04* | (2006.01) |

(52) U.S. Cl.
CPC ............ *F16H 25/14* (2013.01); *F16B 21/02* (2013.01); *F16B 37/042* (2013.01)

(58) Field of Classification Search
CPC ......... F16B 21/02; F16B 37/042; F16H 25/14
See application file for complete search history.

(56) References Cited

U.S. PATENT DOCUMENTS

| | | | |
|---|---|---|---|
| 488,960 A | 12/1892 | Brintnall | |
| 826,607 A * | 7/1906 | Price ...................... | E05G 1/00 |
| | | | 109/59 R |
| 3,158,017 A | 11/1964 | Guze, Jr. | |
| 3,760,618 A * | 9/1973 | Wiczer ..................... | E05G 1/04 |
| | | | 292/37 |
| 4,233,913 A | 11/1980 | Herrmann | |
| 4,245,567 A * | 1/1981 | Herrmann .......... | E05B 15/1614 |
| | | | 109/64 |
| 4,342,207 A | 8/1982 | Holmes et al. | |

(Continued)

FOREIGN PATENT DOCUMENTS

| | | |
|---|---|---|
| DE | 20219916 | 3/2003 |
| FR | 2958264 | 10/2011 |

(Continued)

*Primary Examiner* — Jonathan P Masinick
(74) *Attorney, Agent, or Firm* — Richard C. Litman

(57) ABSTRACT

The radially engaging coupling system comprises numerous embodiments for connecting two or more concentric components with radially extending or retracting bolts. Most embodiments include a ring having a plurality of Archimedean spiral slotted segments. Each bolt has a pin extending laterally therefrom to engage a corresponding slot in the ring. Rotation of the ring drives the pins and their bolts outward or inward to engage or disengage an outer component. Some embodiments have inwardly or outwardly spaced pin passages in the ring, rather than the spiral slots. The disc may comprise a snap ring. Another embodiment has two axially spaced spirally slotted rings, with a plurality of cylindrical rollers therebetween. Rotation of the rings drives the rollers inward or outward to engage corresponding axial grooves in the inner shaft. In another embodiment each bolt has an arcuate segment extending thereacross, to engage a corresponding circumferential groove in an outer component.

1 Claim, 17 Drawing Sheets

(56) References Cited

U.S. PATENT DOCUMENTS

| | | | | |
|---|---|---|---|---|
| 4,493,199 A * | 1/1985 | Uyeda | ............... | E05B 65/0075 |
| | | | | 70/1.5 |
| 7,153,074 B2 | 12/2006 | Wei | | |
| 8,123,428 B2 * | 2/2012 | Wareham | ............... | F16B 7/042 |
| | | | | 248/188.5 |
| 9,027,423 B1 * | 5/2015 | Cui | ............... | F16H 25/20 |
| | | | | 74/53 |
| 9,091,382 B2 * | 7/2015 | Gresh | ............... | F16L 41/04 |
| 2006/0024148 A1 | 2/2006 | Wei | | |
| 2010/0193290 A1 * | 8/2010 | Cui | ............... | B66F 11/042 |
| | | | | 182/69.5 |
| 2014/0083217 A1 * | 3/2014 | Liu | ............... | F16D 1/0876 |
| | | | | 74/44 |
| 2015/0122059 A1 | 5/2015 | Cui | | |

FOREIGN PATENT DOCUMENTS

| | | |
|---|---|---|
| FR | 2981694 | 4/2013 |
| NZ | 575488 | 6/2011 |

* cited by examiner

RADIALLY ENGAGING COUPLING SYSTEM

BACKGROUND OF THE INVENTION

1. Field of the Invention

The present invention relates to mechanical connectors and couplers, and particularly to several embodiments of a radially engaging coupling system.

2. Description of the Related Art

The need to connect various rotating components to one another, e.g., a driveshaft driving a driven component, is nearly universal in a large number of different fields and industries. Perhaps the most common connector principle is the provision of mating flanges on two shafts, with a series of bolts being installed through the flanges to secure the two shafts together. This assembly or connection system is relatively economical in terms of the fabrication of the componentry required, but is clearly very time and labor intensive for assembly and disassembly. The labor costs involved in repetitive assembly and disassembly can easily exceed the initial economies achieved in such a simple structure.

Accordingly, a number of different systems for connecting rotary or other components to one another have been developed in the past. An example is found in German Patent Publication No. 20,219,916 published on Mar. 13, 2003 to Huangslite Industrial Co. This reference describes (according to the drawings and English abstract) an assembly comprising a lamp or light base with a shade and connecting ring for the base and shade. The lamp base has a snap-fit portion for attachment to the connecting ring, and the shade attaches to the ring by means of mating axial ridges and slots.

Another example is found in French Patent Publication No. 2,958,264 published on Oct. 7, 2011 to Airbus Operations SAS. This reference describes (according to the drawings and English abstract) a quick release system for securing an engine pylon to a wing on a large jet powered aircraft. The system essentially comprises a pin that is installed axially in mating passages of the structure, with the pin having radially extending and retracting components that are operated by a mechanism extending from the end of the pin, to lock the pin in place or to allow the pin to be removed.

Yet another example is found in French Patent Publication No. 2,981,694 published on Apr. 26, 2013 to SNECMA. This reference describes (according to the drawings and English abstract) a system for connecting two tubular components, e.g., a jet engine and a heat shroud, coaxially with one another. The system comprises what is essentially a large snap ring with opposite axial projections that lock into cooperating notches in the end of the engine and the inner wall of the shroud, thus preventing relative rotation between and separation of the components.

Thus, a radially engaging coupling system solving the aforementioned problems is desired.

SUMMARY OF THE INVENTION

The radially engaging coupling system includes several embodiments, each of which secures at least two coaxial components to one another by driving or holding a plurality of radial bolts inward or outward from one of the components to engage or disengage the other component(s).

A first embodiment comprises an inner ring with a plurality of Archimedes spiral segments formed therein. A corresponding plurality of bolts extends radially from the ring, with each of the bolts having a pin extending laterally therefrom, i.e., parallel to the rotational axis of the components, to engage a corresponding spiral segment. Rotation of the ring drives the pins, and thus the bolts, radially outward to engage corresponding receptacles in an outer component, or to retract the bolts from the outer component. In a second embodiment, the spiral segments are formed in a snap ring that seats in an internal circumferential groove within the outer component.

A third embodiment replaces the spiral segments with a series of pin passages through the ring, with the passages being of two different radial distances from the center of the ring. Placing the bolt pins in the outer passages results in the bolts being extended to engage the outer component, while placing the bolt pins in the inner passages holds the bolts in a retracted state. In a related embodiment, the passages are formed in a snap ring that seats in an internal circumferential groove within the outer component.

Another embodiment comprises a pair of axially spaced rings each having a plurality of spiral segments formed therein. Generally cylindrical rollers extend between corresponding spiral segments of the two rings, and are driven radially outward or inward upon rotation of the rings. When driven inward, they engage corresponding grooves or channels in an inner shaft to lock the inner shaft and an outer component rotationally. Rotating the rings in the opposite direction drives the rollers outward to retract them from the grooves or channels of the inner shaft, thus freeing the inner shaft and outer component rotationally from one another.

A further embodiment operates similarly to the first embodiment described further above, but each of the bolts has a beveled edge that engages a corresponding slope formed in the receptacles of an outer component. When the bolts of the inner component are extended to engage the receptacles of the outer component, the beveled edges of the bolts produce an axial thrust on the corresponding slopes in the receptacles of the outer component to seat the inner component more firmly within the outer component.

In another embodiment each of the radially disposed bolts has an arcuate segment extending across the outer end thereof. The arcuate segments engage a corresponding groove in an outer component to lock the inner and outer components rotationally to one another. In a closely related embodiment, the arcuate segments comprise bearing races with ball bearings therein.

Yet another embodiment comprises inner, medial, and outer components, with the medial component comprising a spirally slotted ring. The bolts are driven outwardly to engage the outer component or inwardly to engage the inner component, depending upon relative rotation of the medial ring.

In another embodiment, the bolts are secured within a ring having stamped seats or depressions therein for containing the bolts. The mechanism operates in the manner described above, with each of the bolts having a pin extending laterally therefrom to be driven or positionally controlled by engaging a slot or passage in a control disc.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The radially engaging coupling system comprises multiple embodiments, each having an inner component with one or more (preferably a plurality of) bolts extending radially therefrom, and an outer component having a number of receptacles corresponding to the number of bolts. The bolts are selectively engaged with the outer component to lock the outer component rotationally with the inner component, or selectively disengaged from the outer component to allow the two components to rotate relative to one another. A variety of different mechanisms are provided to extend or retract the bolts radially for component engagement or disengagement.

Figure 1:
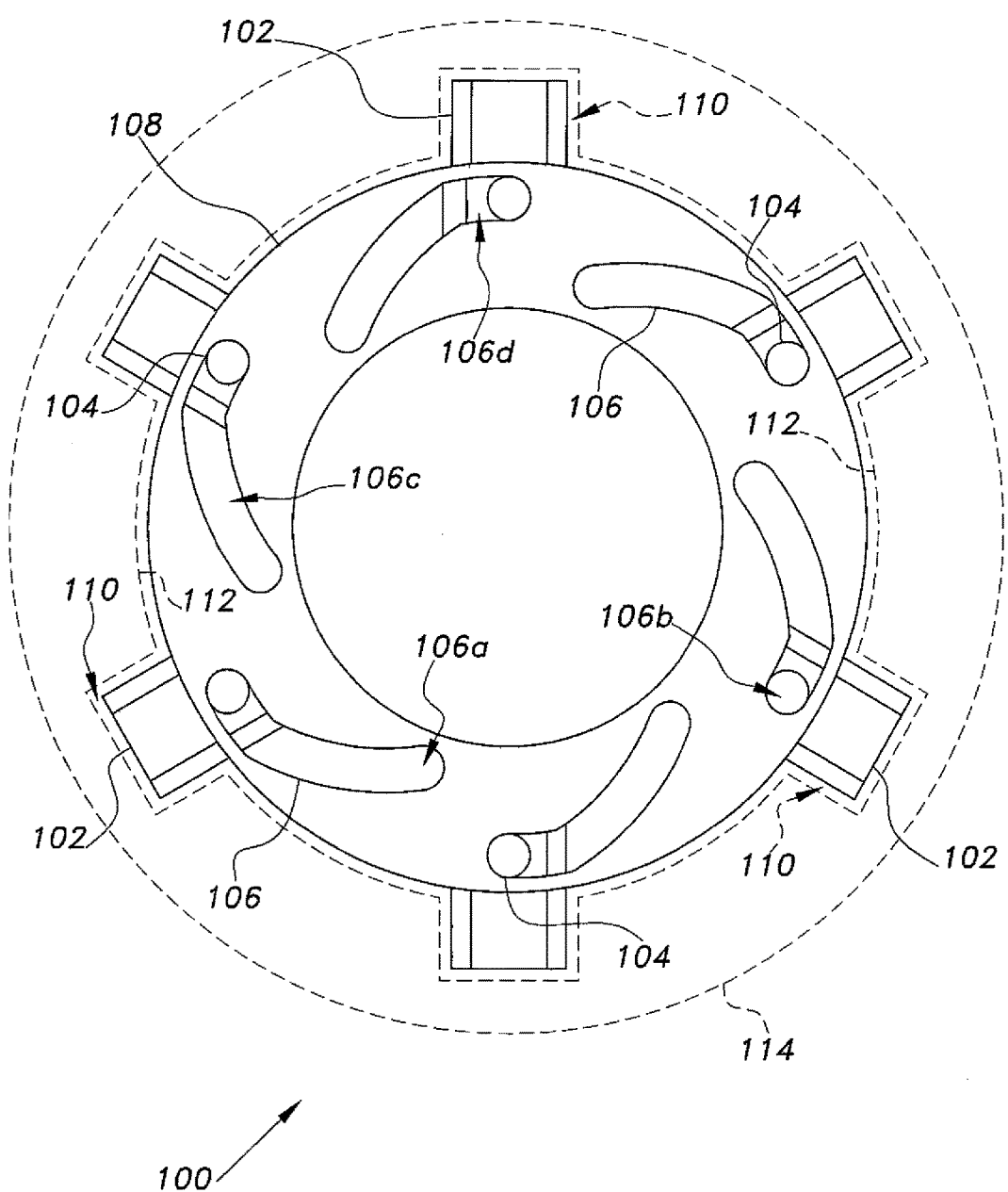
FIG. 1 is a front elevation view of a first embodiment of the radially engaging coupling system according to the present invention, illustrating the essential features thereof.

FIG. 1 is a front elevation view of a first embodiment of the radially engaging coupling system, designated as coupling system 100. The coupling system 100 includes a plurality of radially disposed bolts 102 with each having a pin 104 extending laterally therefrom, i.e., parallel to the rotational axis of the components. The bolt pins 104 engage corresponding passages 106 in a ring 108, with the bolts 102 being distributed radially about the ring 108. Each of the passages 106 in the ring 108 comprises a plurality of inner pin passages 106a and outer pin passages 106b, with the inner pin passages 106a being positioned closer to the center of the coaxial assembly than the outer pin passages 106b. When the bolt pins 104 are engaged with the inner pin passages 106a, the bolts 102 are retracted inwardly toward the center of the coaxial assembly. When the pins 104 are engaged with the outer pin passages 106b as shown in FIG. 1, the bolts 102 are extended outwardly to engage corresponding radially disposed receptacles 110 in the inner surface 112 of a concentric outer component 114 (shown in broken lines in FIG. 1, for clarity).

In the embodiment 100 of FIG. 1, the inner and outer pin passages 106a and 106b of each passage 106 are joined by Archimedean spiral slots 106c to provide a continuous path of travel for the bolt pins 104 when the ring 108 is rotated relative to the outer component 114. However, this continuous spiral path 106c connecting the inner and outer pin passages 106a and 106b is not an absolute requirement of any of the embodiments of the coupling system, as will be seen in subsequent embodiments. An additional relatively short non-Archimedean circumferential arc portion 106d is provided from the outer portion of each spiral slot 106c to the corresponding outer pin passage 106b of the embodiment 100 of FIG. 1, serving to lock the bolt pins 104 in their extended positions.

It will be seen that rotation of the ring 108 clockwise relative to the outer component 114, as viewed in FIG. 1, drives the bolt pins 104 inward as they travel beyond the short circumferential slot portions 106d and then along the spiral portions 106c of the passages 106. This results in the retraction of the bolts 102 from corresponding radially disposed receptacles 110 formed in the outer component 114. Conversely, rotation of the ring 108 in a counterclockwise direction results in the extension of the bolts 102 into the receptacles 110 of the outer component 114 as the bolt pins 102 travel along the spiral slots 106e, thereby locking the outer component 114 rotationally to the ring 108, as shown in FIG. 1.

FIGS. 2A through 3B illustrate a second embodiment of the radially engaging coupling system, designated as coupling system 200. The coupling system 200 includes a plurality of radially disposed bolts 202, each having a pin 204 extending laterally therefrom. The bolt pins 204 engage corresponding inner passages 206a or outer passages 206b in a ring 208, with the inner pin passages 206a being positioned closer to the center of the coaxial assembly than the outer pin passages 206b. This embodiment differs from the embodiment 100 of FIG. 1 in that the inner and outer pin passages 206a and 206b are separated from one another, rather than being connected by an intermediate Archimedean spiral slot, as in the embodiment of FIG. 1. The bolts 202 are distributed radially about the ring 208.

Figure 2A:
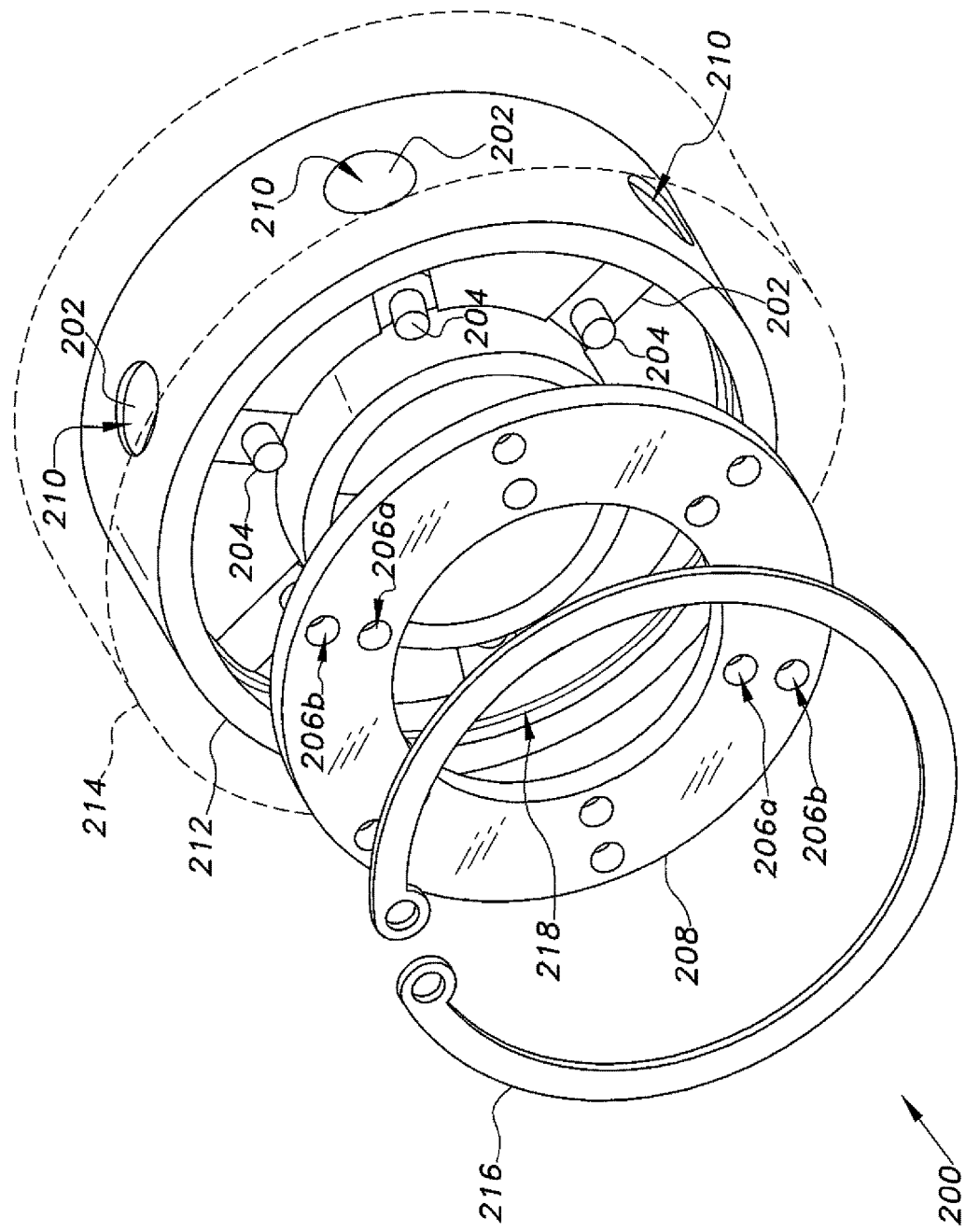
FIG. 2A is an exploded perspective view of a second embodiment of the radially engaging coupling system according to the present invention, illustrating a disengaged condition.
Figure 2B:
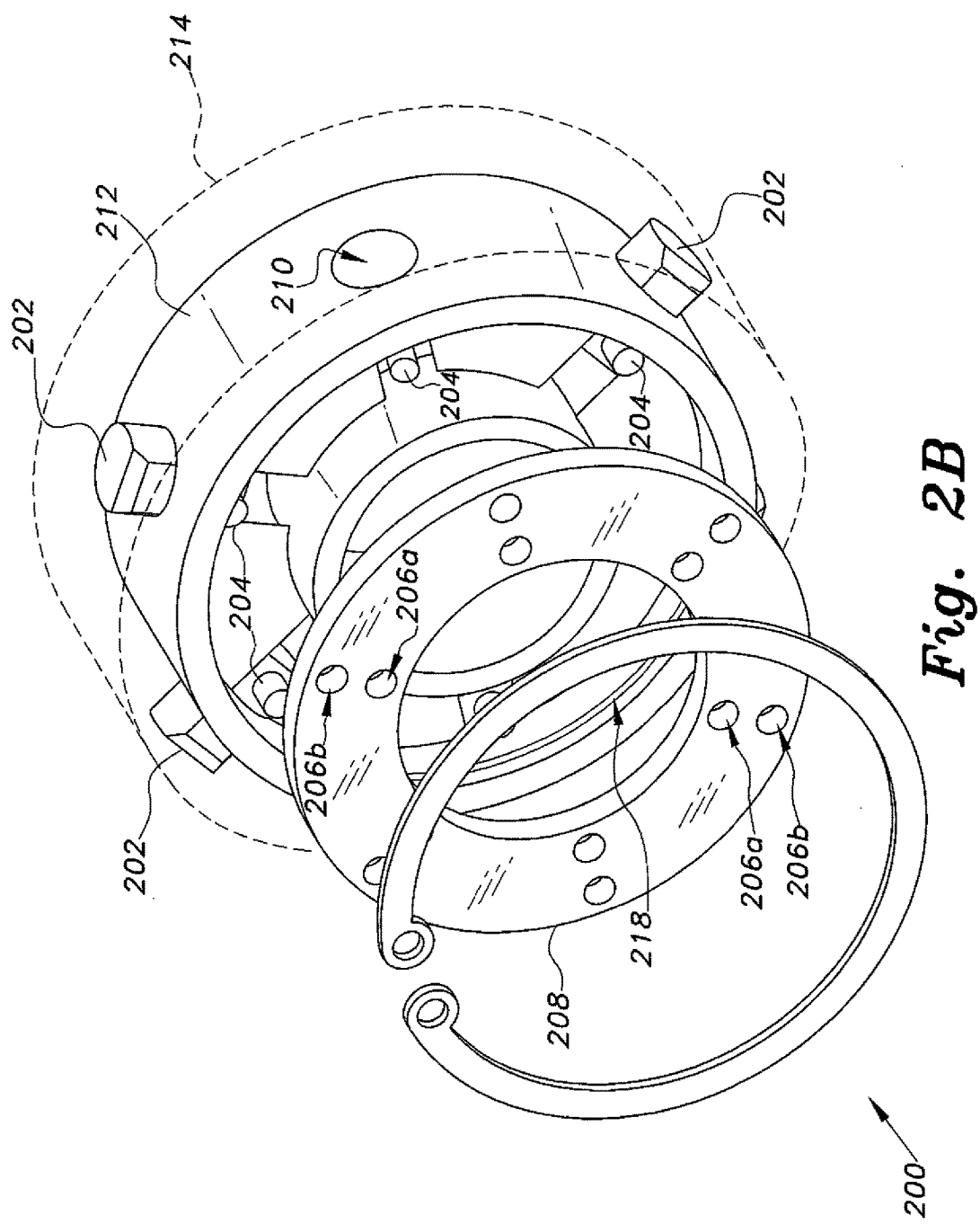
FIG. 2B is an exploded perspective view of the embodiment of FIG. 2A of the radially engaging coupling system according to the present invention, illustrating an engaged condition.
Figure 3A:
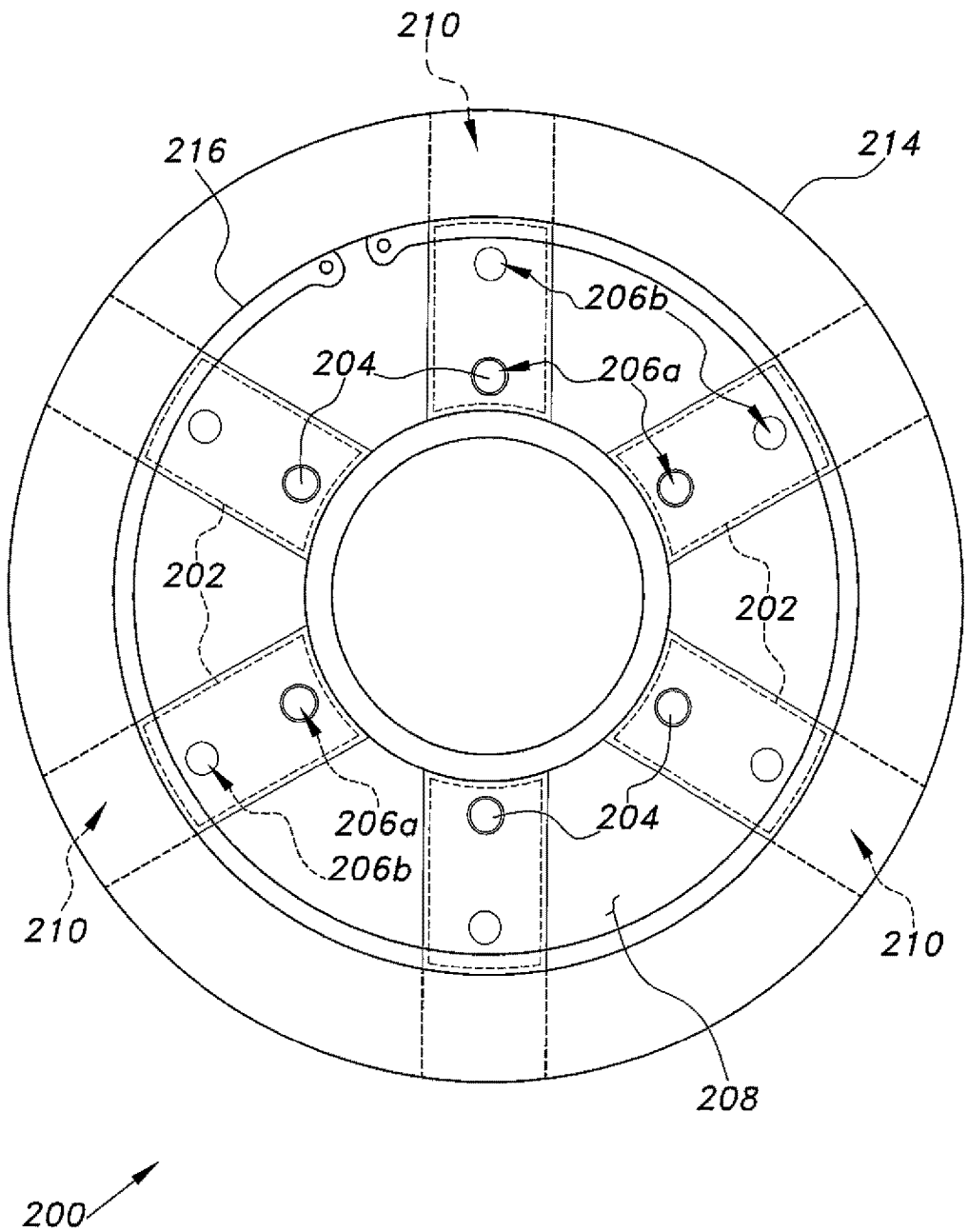
FIG. 3A is a front elevation view of the embodiment of FIGS. 2A and 2B of the second embodiment of the radially engaging coupling system according to the present invention, corresponding to the disengaged condition illustrated in FIG. 2A.
Figure 3B:
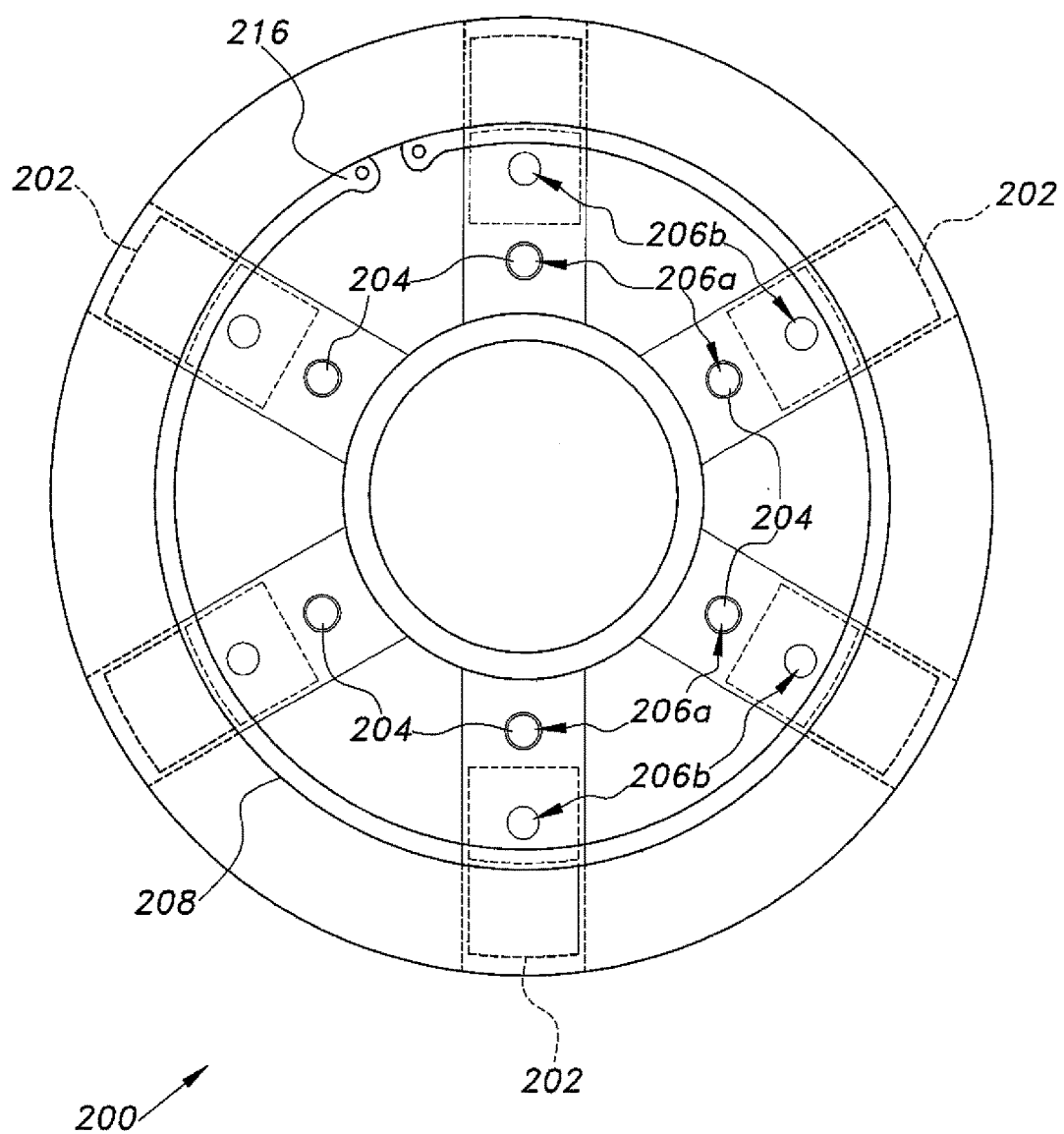
FIG. 3B is a front elevation view of the embodiment of FIGS. 2A and 2B of the radially engaging coupling system according to the present invention, corresponding to the engaged condition illustrated in FIG. 2B.

When the bolt pins 204 are engaged with the inner pin passages 206a, the bolts 202 are retracted inwardly toward the center of the coaxial assembly, as shown in FIGS. 2A and 3A. When the pins 204 are engaged with the outer pin passages 206b as shown in FIGS. 2B and 3B, the bolts 202 are extended outwardly to engage corresponding radially disposed receptacles 210 that extend through an inner case 212 (shown in the exploded perspective views of FIGS. 2A and 2B) and a concentric outer component 214 (shown in broken lines in FIGS. 2A and 2B, for clarity). It will be seen in the embodiment 200 of FIGS. 2A through 3B, that the ring 208 containing the inner and outer pin passages 206a and 206b must be lifted axially from the bolt pins 204 in order to allow the bolts 202 to be repositioned between their retracted and extended states. The ring 208 is retained within the inner case 212 by a removable snap ring 216 that seats in an inner groove 218 (shown in FIGS. 2A and 2B) formed in the inner case 212.

Figure 4:
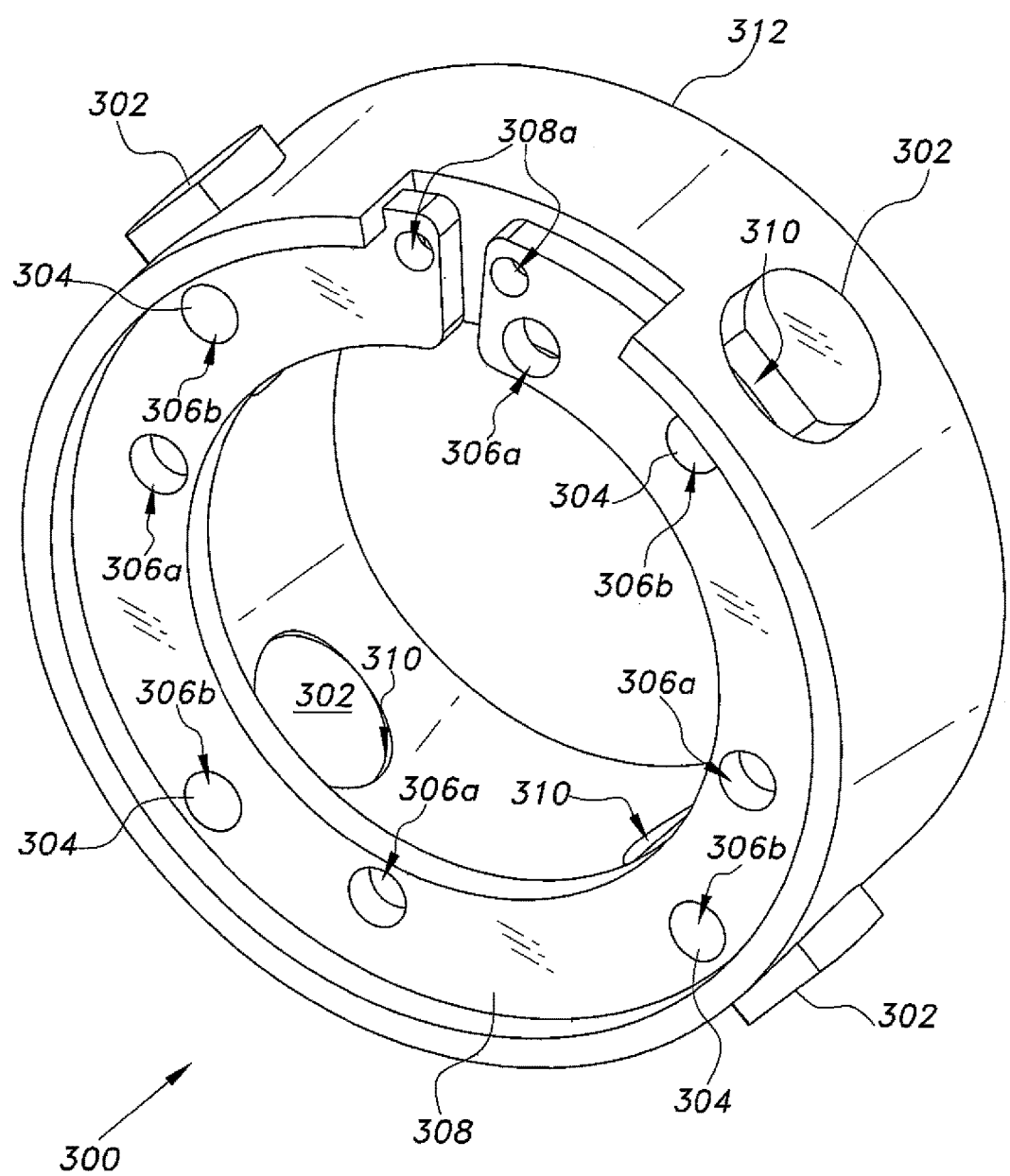
FIG. 4 is a perspective view of a third embodiment of the radially engaging coupling system according to the present invention, with a portion of the structure shown removed for clarity.

FIG. 4 illustrates a radially engaging coupling system embodiment 300 that is similar to the coupling system embodiment 200 of FIGS. 2A through 3B. However, the outer component is not shown in FIG. 4, for clarity. The outer component of the embodiment 300 of FIG. 4 would be essentially identical to the outer component 214 of the embodiment 200 of FIGS. 2A through 3B. The coupling system embodiment 300 of FIG. 4 includes a plurality of radially disposed bolts 302, each having a pin 304 extending laterally therefrom. (The embodiment 300 of FIG. 4 has only four bolts 302, while the previous embodiments 100 and 200 each included six bolts. The specific number of bolts in each embodiment is not critical to the invention.) The bolt pins 304 engage corresponding inner passages 306a or outer passages 306b in a ring 308, with the inner pin passages 306a being positioned closer to the center of the coaxial assembly than the outer pin passages 306b, as in the embodiment 200 of FIGS. 2A through 3B. The bolts 302 are distributed radially about the ring 308, in corresponding bolt passages 310 formed through the inner case 312.

The operation of the coupling system 300 of FIG. 4 is essentially the same as the operation of the coupling system 200 of FIGS. 2A through 3B, i.e., the ring 308 must be repositioned within the inner case 312 in order for the bolt pins 304 to engage either the inner pin passages 306a or the outer pin passages 306b of the ring 308. Thus, the ring 308 must be shifted or moved axially outward from the inner case 312 in order for the bolt pins 304 to withdraw from the corresponding pin passages, e.g., the outer pin passages 306b holding the bolts 302 in their radially extended positions as shown in FIG. 4, to their alternate retracted positions. However, the coupling system 300 differs from the coupling system 200 in that the ring 308 comprises a snap ring, rather than requiring a separate snap ring as in the embodiment 200 of FIGS. 2A through 3B. An appropriate tool, e.g., snap ring pliers, are used to engage the two snap ring eyes 308a in order to remove and replace the snap ring 308 in the inner case 312.

Figure 5:
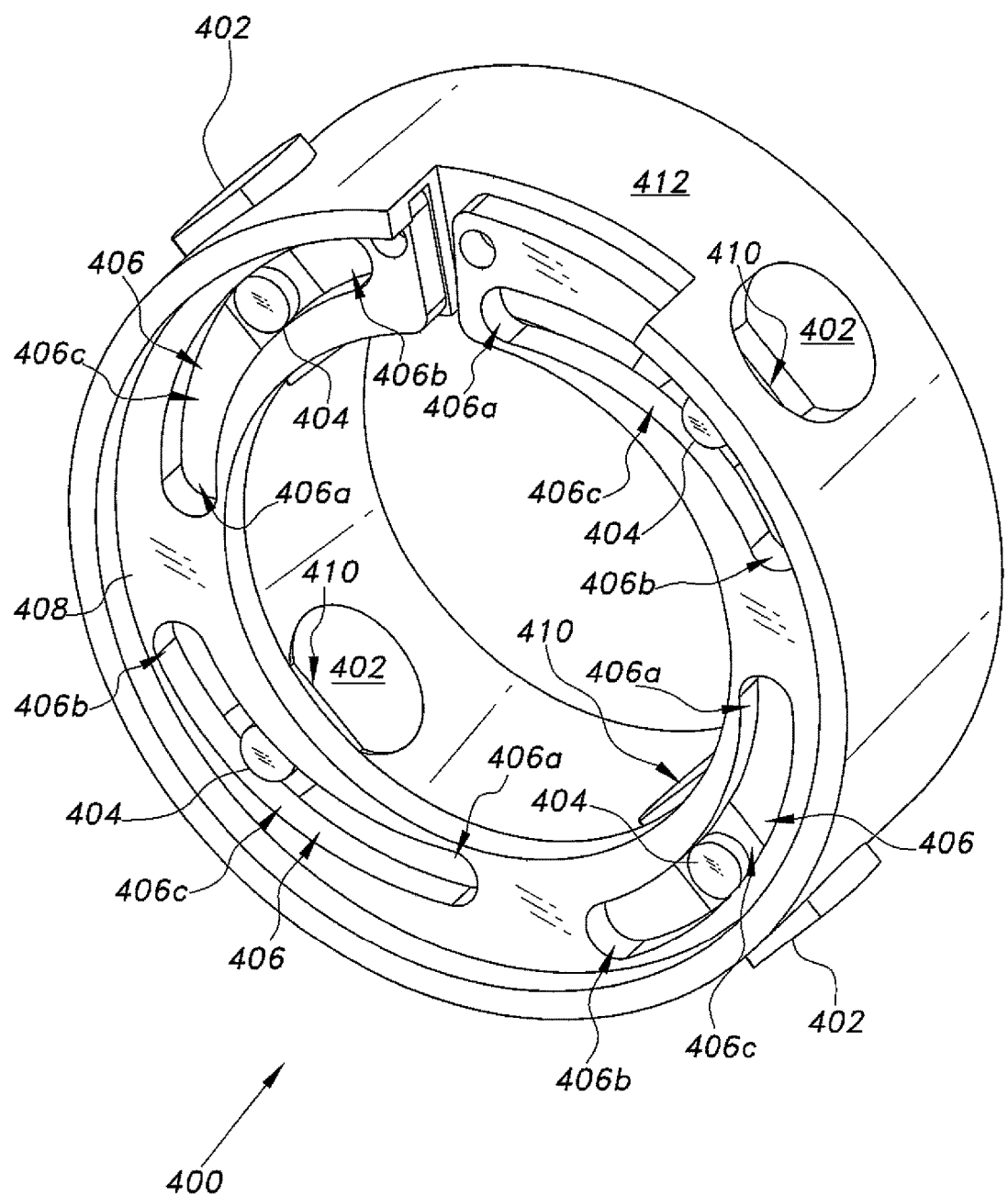
FIG. 5 is a perspective view of a fourth embodiment of the radially engaging coupling system according to the present invention, with a portion of the structure shown removed for clarity.

The coupling system embodiment 400 of FIG. 5 is quite similar to the embodiment 300 of FIG. 4, having a plurality of radially disposed bolts 402, e.g., four in the embodiment 400 of FIG. 5, with each having a pin 404 extending laterally therefrom. The bolt pins 404 engage corresponding pin passages 406 disposed through the ring 408. In the embodiment 400 of FIG. 5, the inner and outer pin passages 406a and 406b of each passage 406 are joined by Archimedean spiral slots 406c to provide a continuous path of travel for the bolt pins 404 when the ring 408 is rotated relative to the inner case 412 and outer component (not shown in FIG. 5). The bolts 402 are distributed radially about the ring 408, in corresponding bolt passages 410 formed through the inner case 412. The ring 408 comprises a snap ring, as in the coupling system embodiment 300 of FIG. 4. However, due to the continuous, smooth Archimedean spiral slots 406c extending between the inner and outer pin passages 406a and 406b in each pin passage 406, it is not necessary to remove the snap ring 408 in order to reposition the bolts 402. Rather, the snap ring 408 may be rotated in the inner housing or case 412 to cause the bolt pins 404 to ride along the spiral portions 406c of the passages 406, thereby extending or retracting the bolts 402 into or out of the outer case (not shown in FIG. 5, but similar to the outer case 114 of FIG. 1 or the outer case 214 of FIGS. 2A through 3B).

Figure 6:
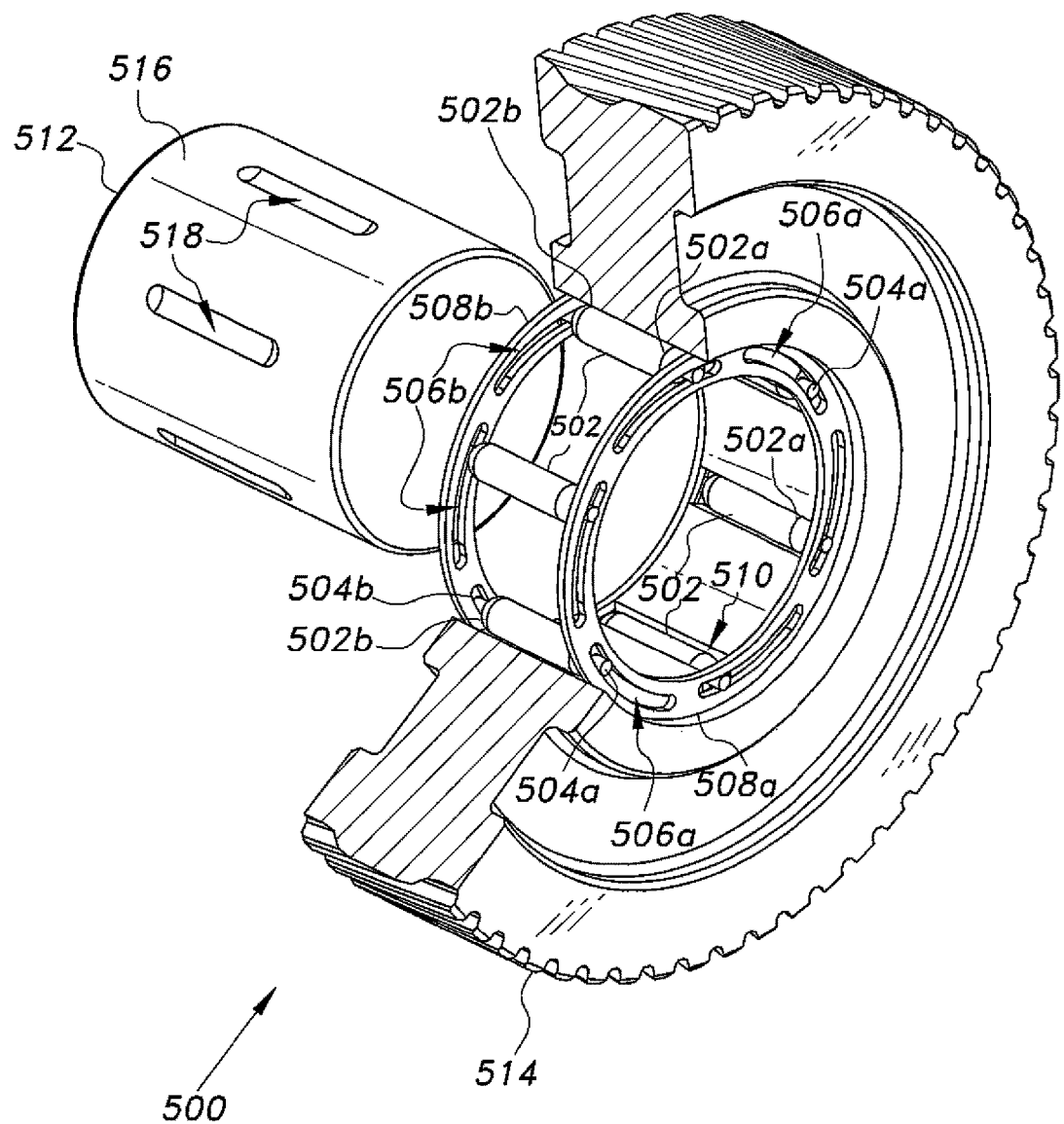
FIG. 6 is an exploded perspective view of a fifth embodiment of the radially engaging coupling system according to the present invention, with a portion of the structure removed for clarity.
Figure 7A:
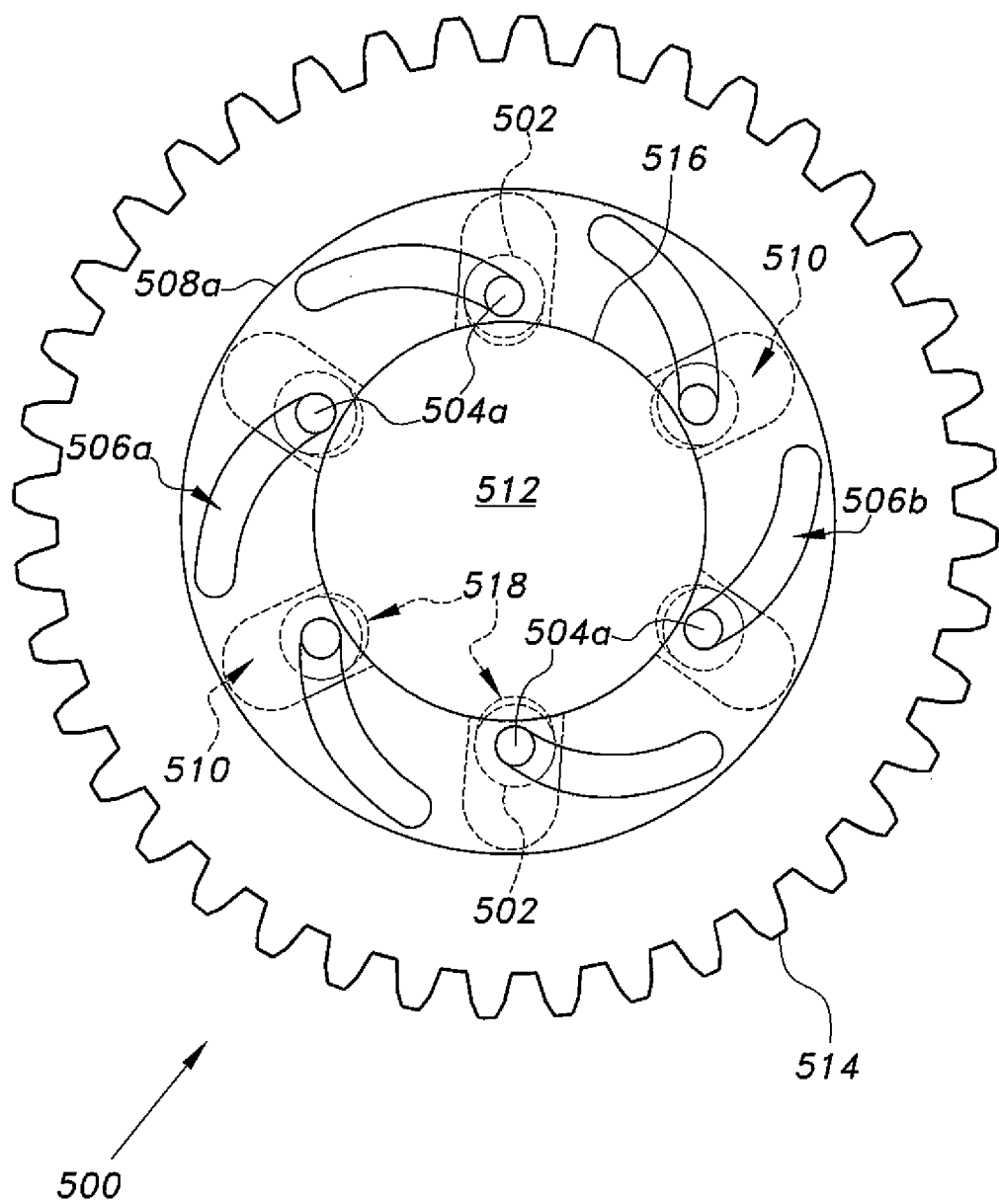
FIG. 7A is a front elevation view of the embodiment of FIG. 6 of the radially engaging coupling system according to the present invention, showing the coupling system in an engaged condition.
Figure 7B:
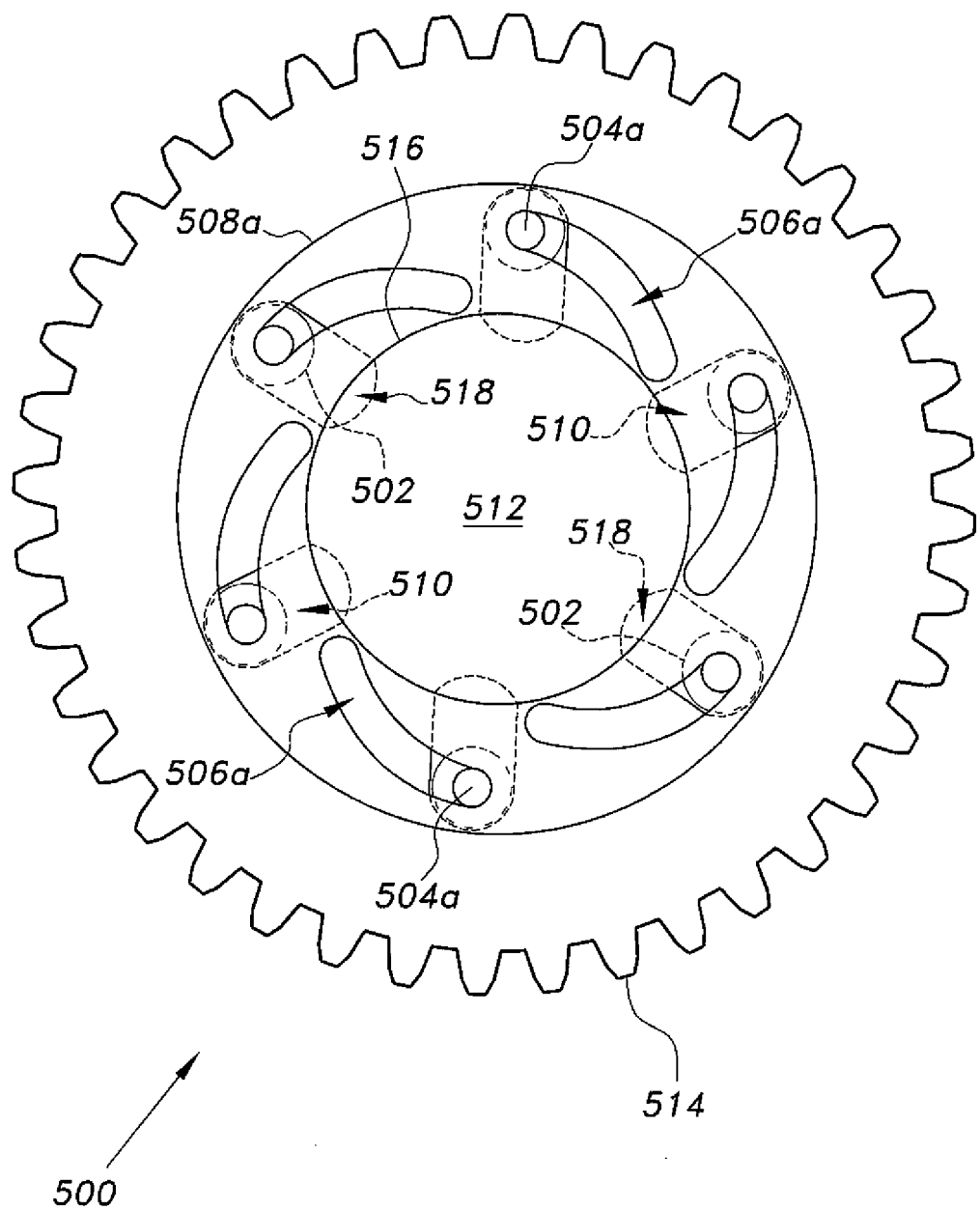
FIG. 7B is a front elevation view of the embodiment of FIG. 6 of the radially engaging coupling system of FIG. 6 according to the present invention, showing the coupling system in a disengaged condition.

FIGS. 6 through 7B illustrate another embodiment of the radially engaging coupling system, designated as coupling system 500. The coupling system 500 includes two axially separated rings rather than a single ring, with each of the bolts 502 comprising an axially disposed cylindrical roller having mutually opposed first and second ends, respectively 502a and 502b. Each bolt or roller 502 includes a first pin 504a extending axially from the first end 502a and an opposite second pin 504b extending axially from the second end 502b.

A plurality of first pin passages 506a is provided through the first ring 508a, with a like number of pin passages 506b disposed through the second ring 508b. The pin passages of each ring correspond in number to the number of bolts 502. Each pin passage 506a, 506b comprises an inboard end and an opposite outboard end joined or connected by an Archimedean spiral slot, generally like the slot configuration comprising the inner and outer ends 406a, 406b and the spiral slot 406c extending therebetween in the embodiment 400 of FIG. 5. Alternatively, a relatively short non-Archimedean semi-circumferential extension may be provided from the outer end of each slot, similar to the passage configuration of the embodiment 100 of FIG. 1, or the passages may comprise separate and distinct inner and outer passages, as in the embodiment 200 of FIGS. 2A through 3B. The first end pin 504a of each of the bolts 502 resides in a corresponding one of the first passages 506a of the first ring 508a, with the opposite second end pin 504b of each bolt residing in a corresponding one of the second passages 506b of the second ring 508b.

The outer component 514, i.e., the externally toothed component shown in section in FIG. 5, includes a plurality of relatively deep bolt receptacles 510 therein with each of the bolt receptacles 510 comprising an axially oriented channel, as shown in the end views of FIGS. 7A and 7B. The inner component 512 is disposed coaxially within the outer component 514, and includes an outer surface 516 with a plurality of axially disposed bolt receptacles 518 therein. The number of bolt receptacles or channels 510 of the outer component 514 and bolt receptacles or channels 518 of the inner component 512 is equal to the number of bolts or rollers 502.

It will be seen that rotation of the two rings 508a, 508b counterclockwise as viewed from the orientation of FIGS. 7A and 7B will result in the bolt or roller pins 504a, 504b traveling radially inward along their respective passages 506a, 506b in the two rings 508a, 508b, thus driving the bolts or rollers 502 radially inward as well to seat within the receptacles or channels 518 of the inner component 512 while remaining at least partially engaged with their respective bolt receptacles or channels 510 in the outer component 514, and thereby locking the inner component 512 rotationally with the outer component 514 as shown in FIG. 7A. Conversely, rotation of the two rings 508a, 508b clockwise as viewed from the orientation of FIGS. 7A and 7B will result in the bolt or roller pins 504a, 504b traveling radially outward along their respective passages 506a, 506b in the two rings 508a, 508b, thus driving the bolts or rollers 502 radially outward as well to retract fully from the receptacles or channels 518 of the inner component 512 and into the deep receptacles or channels 518 of the outer component 512, thus freeing the inner component 512 rotationally relative to the outer component 514 as shown in FIG. 7B.

Figure 8A:
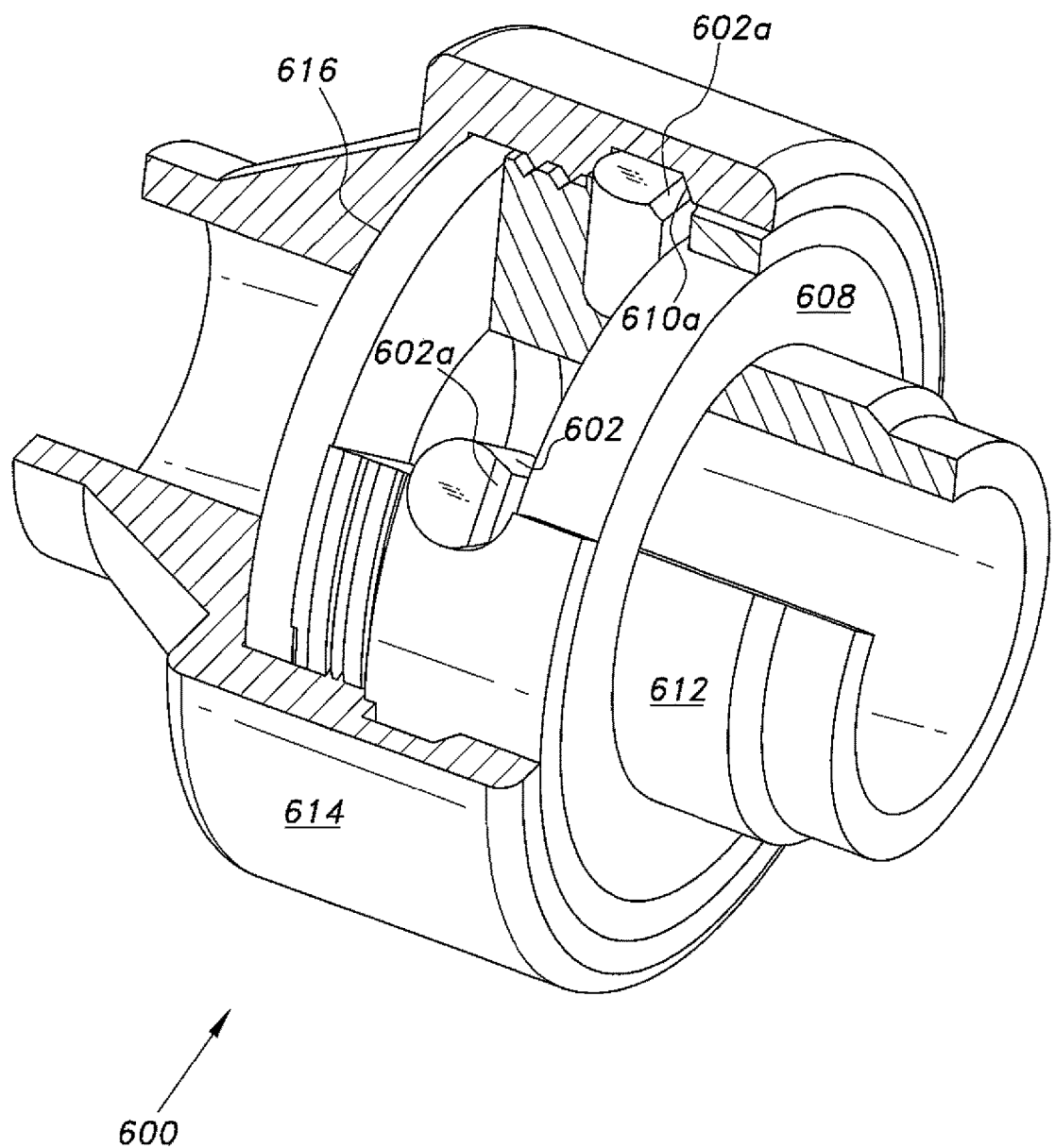
FIG. 8A is a perspective view of a sixth embodiment of the radially engaging coupling system according to the present invention showing the coupling system in an engaged condition, with a portion of the structure removed for clarity.
Figure 8B:
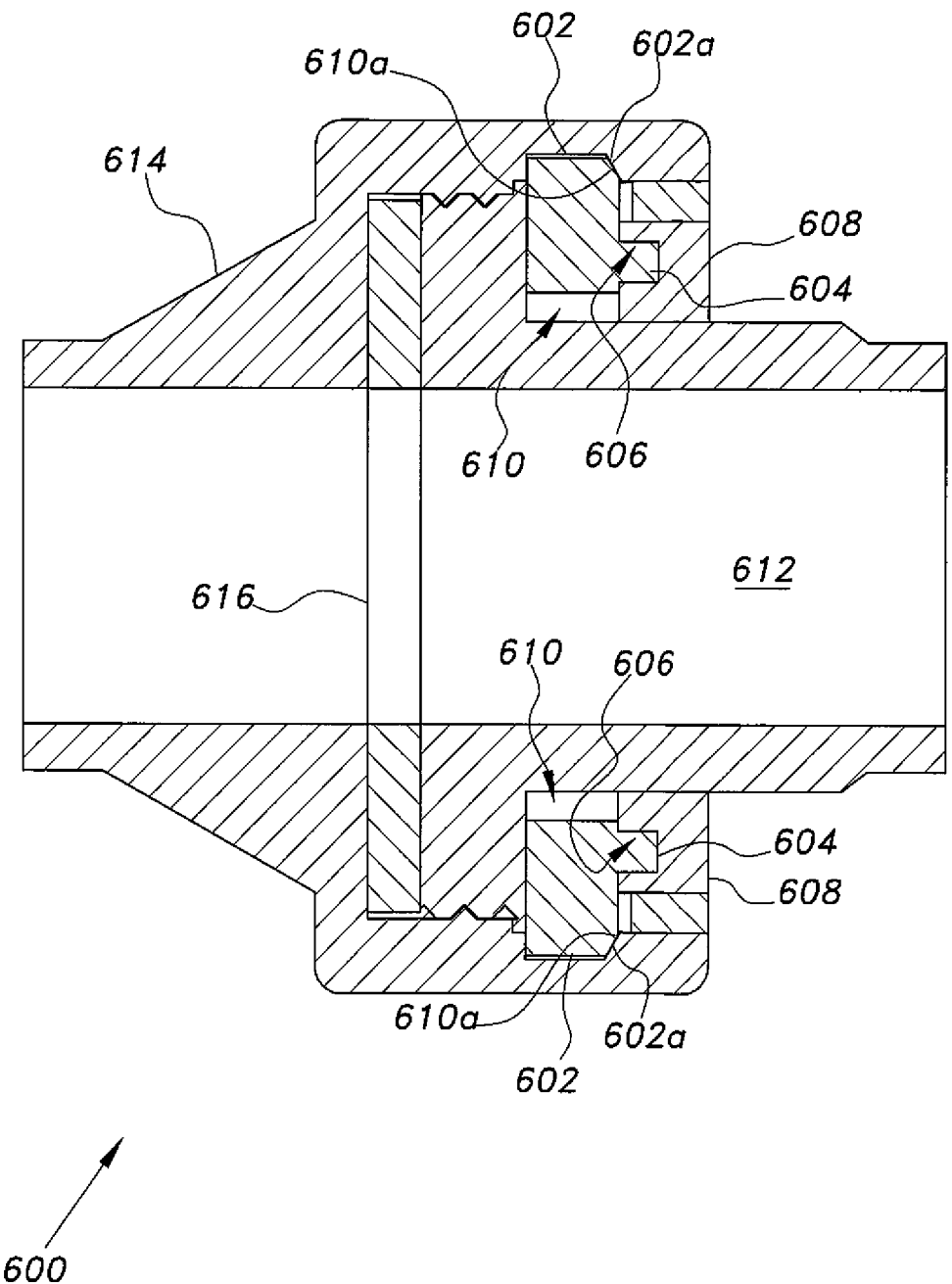
FIG. 8B is a side elevation view in section of the embodiment of FIG. 8A of the radially engaging coupling system according to the present invention, showing the coupling system in an engaged condition.

A further embodiment, designated as coupling system 600, is illustrated in FIGS. 8A and 8B. The general configuration of the embodiment 600 of FIGS. 8A and 8B is similar to that of certain other embodiments, e.g., the first embodiment 100 of FIG. 1, having a plurality of radially disposed bolts 602, each having a pin 604 (shown in FIG. 8B) extending laterally therefrom. The bolt pins 604 engage corresponding passages 606 in a ring 608. The passages 606 are shown only in section in FIG. 8B. It will be understood that the passages 606 may be of any of the configurations described herein for any of the embodiments, i.e., radially inward and outward passages connected by an Archimedean slot or separate inward and outward passages. The bolts 602 are distributed radially about the ring 608, in corresponding bolt passages 610 defined by the inner case 612 and ring 608.

The coupling system 600 of FIGS. 8A and 8B differs from other embodiments described herein, in that the radially outer corner of each of the bolts 602 includes a beveled edge 602a thereon, and the juncture between the side and radially outward end of each of the bolt passages 610 includes a mating beveled face 610a, formed in the outer component 614. When the bolts 602 are driven radially outward due to rotation of the ring 608, the beveled edges 602a of the bolts 602 engage the mating beveled faces 610a of the bolt passage portions of the outer component 614, thus imparting an axial thrust to the inner case 612 to drive it axially into the outer component 614. This aids in seating the inner case 612 against a seal 616 installed between the case 612 and the outer component 614, thereby improving sealing of the assembly.

Figure 9:
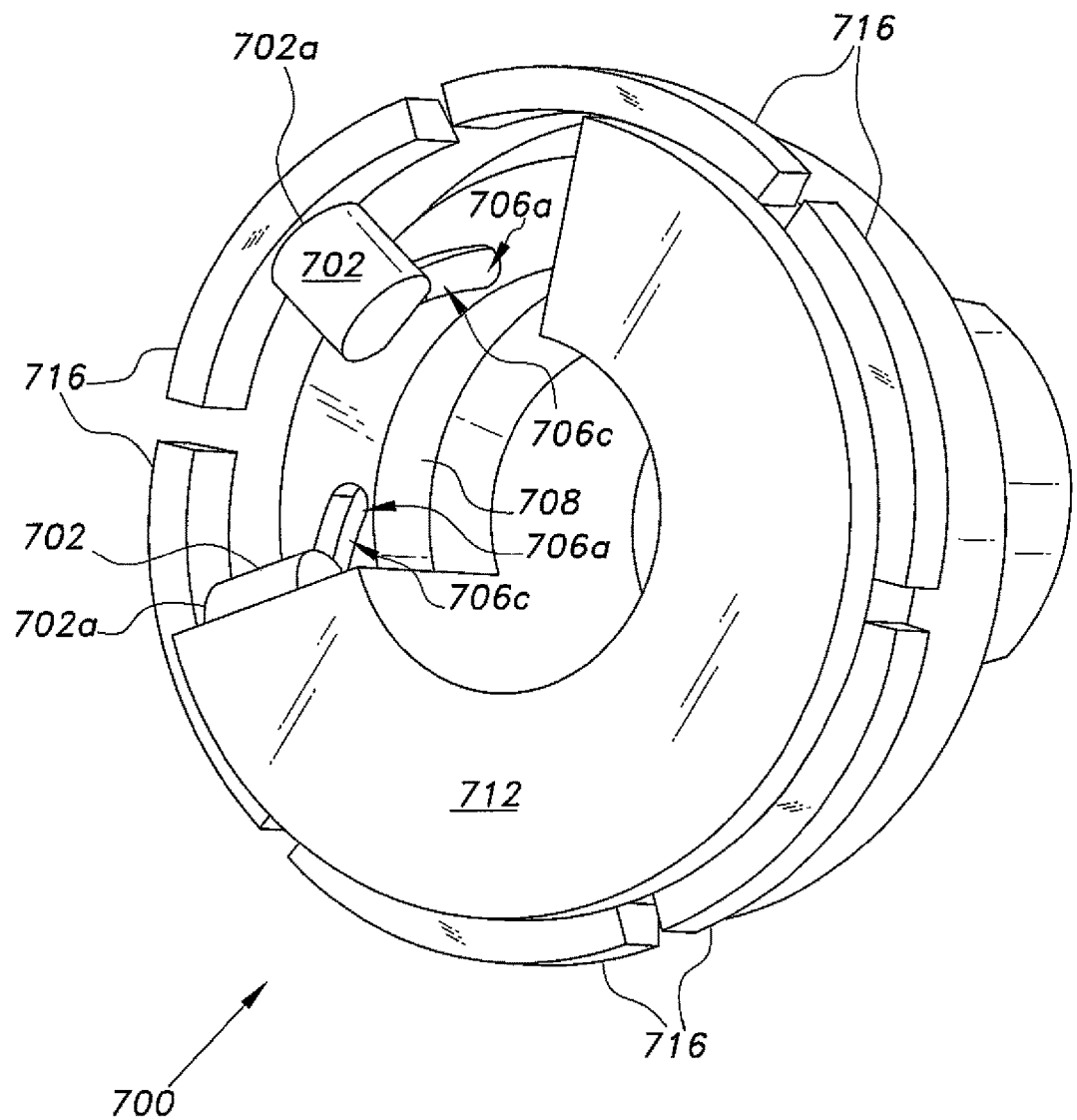
FIG. 9 is a perspective view of a seventh embodiment of the radially engaging coupling system according to the present invention, showing a portion of the structure removed for clarity.

Yet another embodiment, designated as coupling system 700, is illustrated in FIG. 9. The general configuration of the embodiment 700 of FIG. 9 is similar to that of certain other embodiments, e.g., the first embodiment 100 of FIG. 1, having a plurality of radially disposed bolts 702, each having a pin (not shown in FIG. 9, but similar to corresponding components shown in other Figs.) extending laterally therefrom. The bolt pins engage corresponding passages in a ring 708. The radially inner passages 706a and portions of the Archimedean spiral slots 706c are shown in FIG. 9. The bolts 702 are distributed radially about the ring 708, in corresponding bolt passages (not shown in FIG. 9, but similar to corresponding components shown in other Figs.) formed in the inner case 712.

The coupling system 700 of FIG. 9 differs from other embodiments described herein, in that an arcuate segment 716 extends across the radially outer end 702a of each of the bolts 702. The arcuate segments 716 are oriented circumferentially about the assembly, and engage a corresponding circumferential inner groove formed in the outer component when the bolts 702 are driven outward in their receptacles. (The outer component and inner groove therein are not shown in FIG. 9, but analogous components are illustrated in the closely related coupling system embodiment 800 of FIG. 10, discussed immediately below.)

Figure 10:
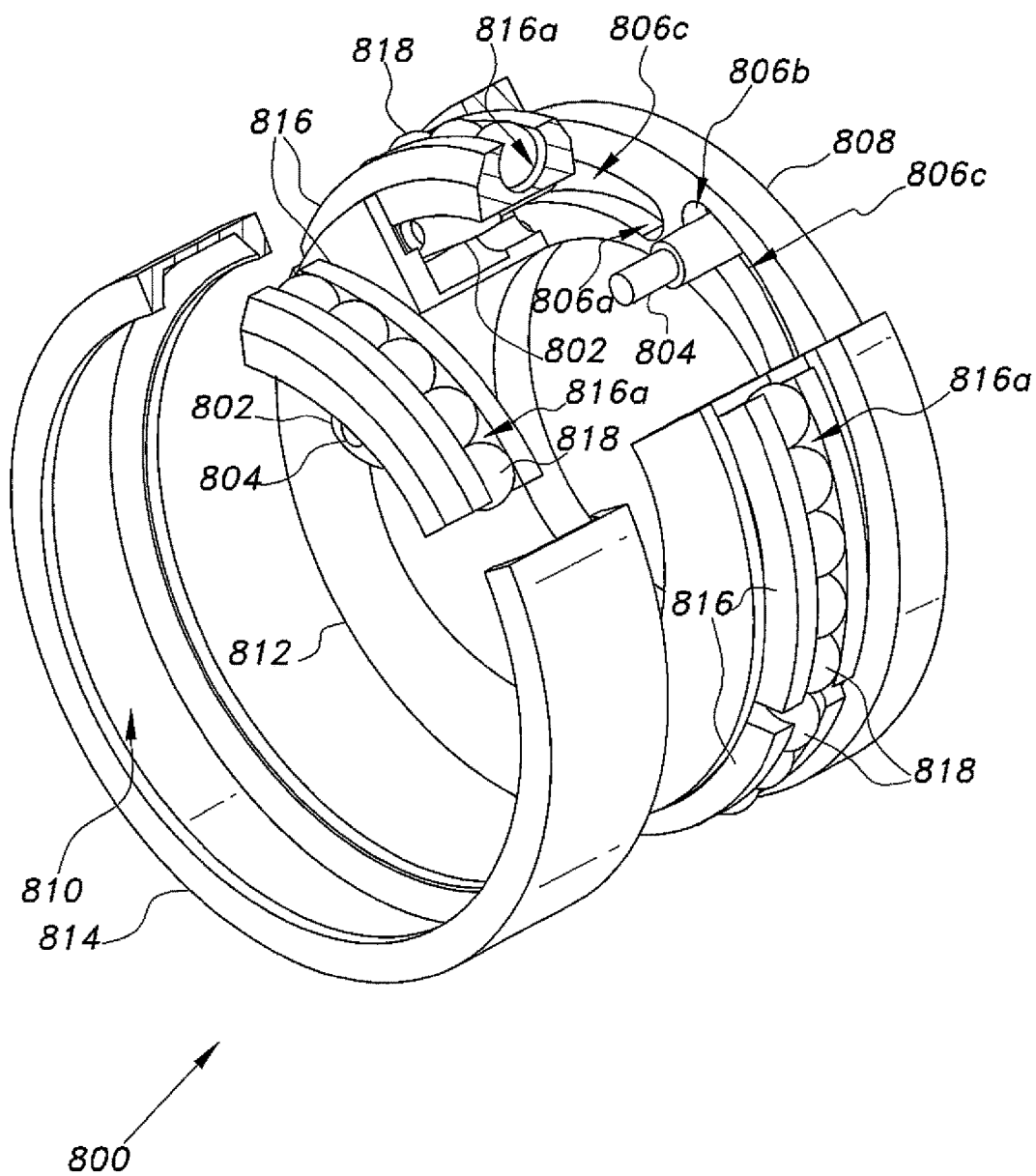
FIG. 10 is an exploded perspective view of an eighth embodiment of the radially engaging coupling system according to the present invention, showing a portion of the structure removed for clarity.

Yet another embodiment, designated as coupling system 800, is illustrated in FIG. 10. The coupling system 800 of FIG. 10 is closely related to the coupling system 700 of FIG. 9, having a plurality of radially disposed bolts 802, each having a pin 804 extending laterally therefrom. The bolt pins 804 engage corresponding passages in a ring 808, the passages comprising radially inner passages 806a, radially outer passages 806b, and Archimedean spiral slots 806c connecting the inner and outer passages 806a and 806b. The bolts 802 are distributed radially about the ring 808, in corresponding bolt passages (not shown in FIG. 10, but similar to corresponding components shown in other Figs.) formed in the inner case 812.

The coupling system 800 of FIG. 10 differs from the coupling system embodiment 700 of FIG. 9 in that the arcuate segments 816 extending across the radially outer ends of the bolts 802 include circumferential grooves or channels 816a therein, with the grooves serving as bearing races for ball bearings (or other bearing type) 818. The arcuate segments 816 with their ball (or other) bearings 818 seat in a circumferential inner channel or outer bearing race 810 formed in the outer component 814. The coupling system 800 of FIG. 10 operates in the same manner as the coupling system 700 of FIG. 9, with the semicircumferential arcuate segments 816 being driven radially outward to engage the outer component 814 or driven inward to release the outer component. This embodiment does not serve to lock the two components 812 and 814 rotationally, due to the bearings 818, but does lock the two components 812 and 814 axially when the arcuate segments 816 are driven outward to engage the channel 810 of the outer component 814.

Figure 11A:
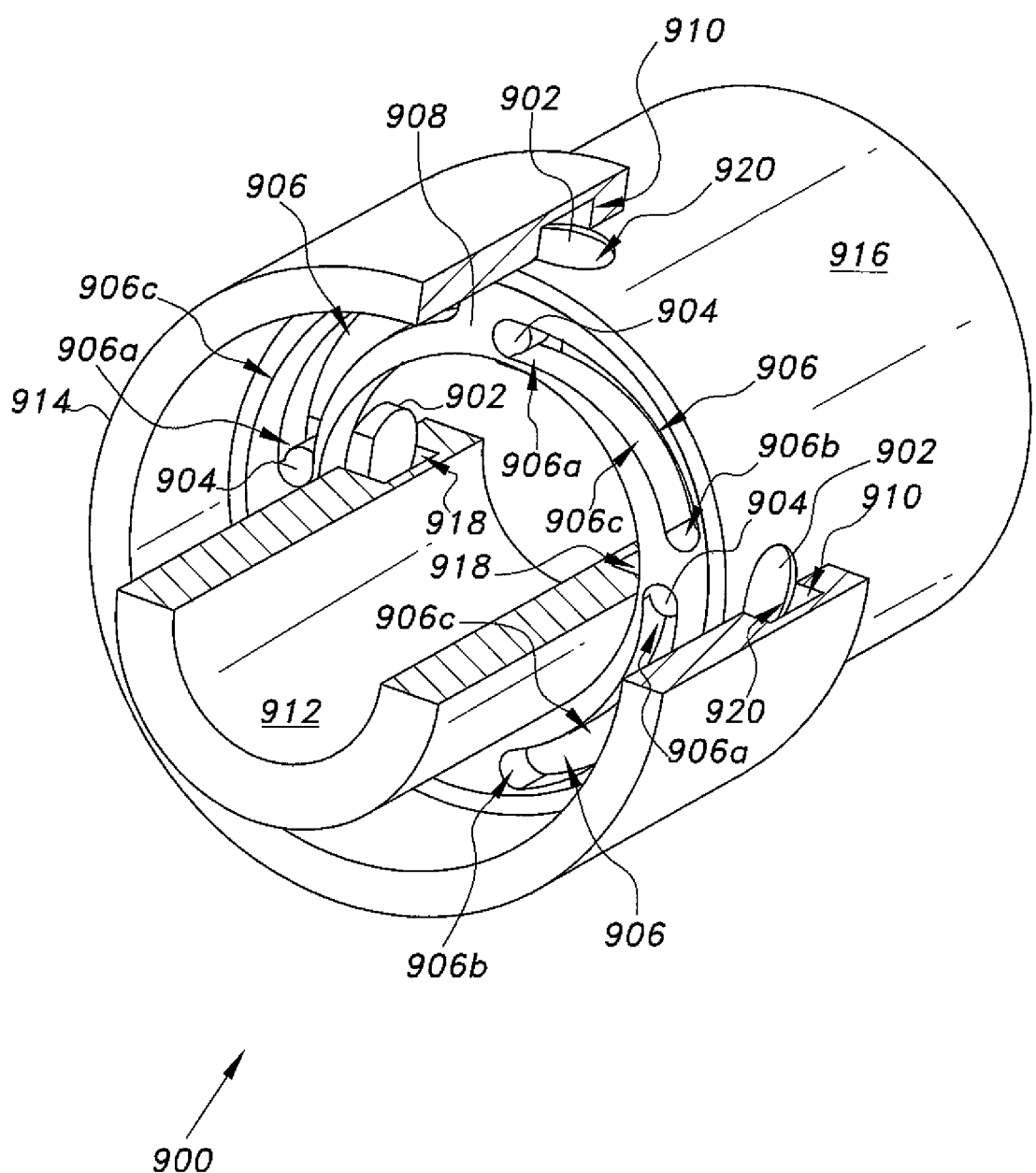
FIG. 11A is a perspective view of a ninth embodiment of the radially engaging coupling system according to the present invention showing the inner and medial components of the system engaged and the medial and outer components disengaged, with a portion of the structure shown removed for clarity.
Figure 11B:
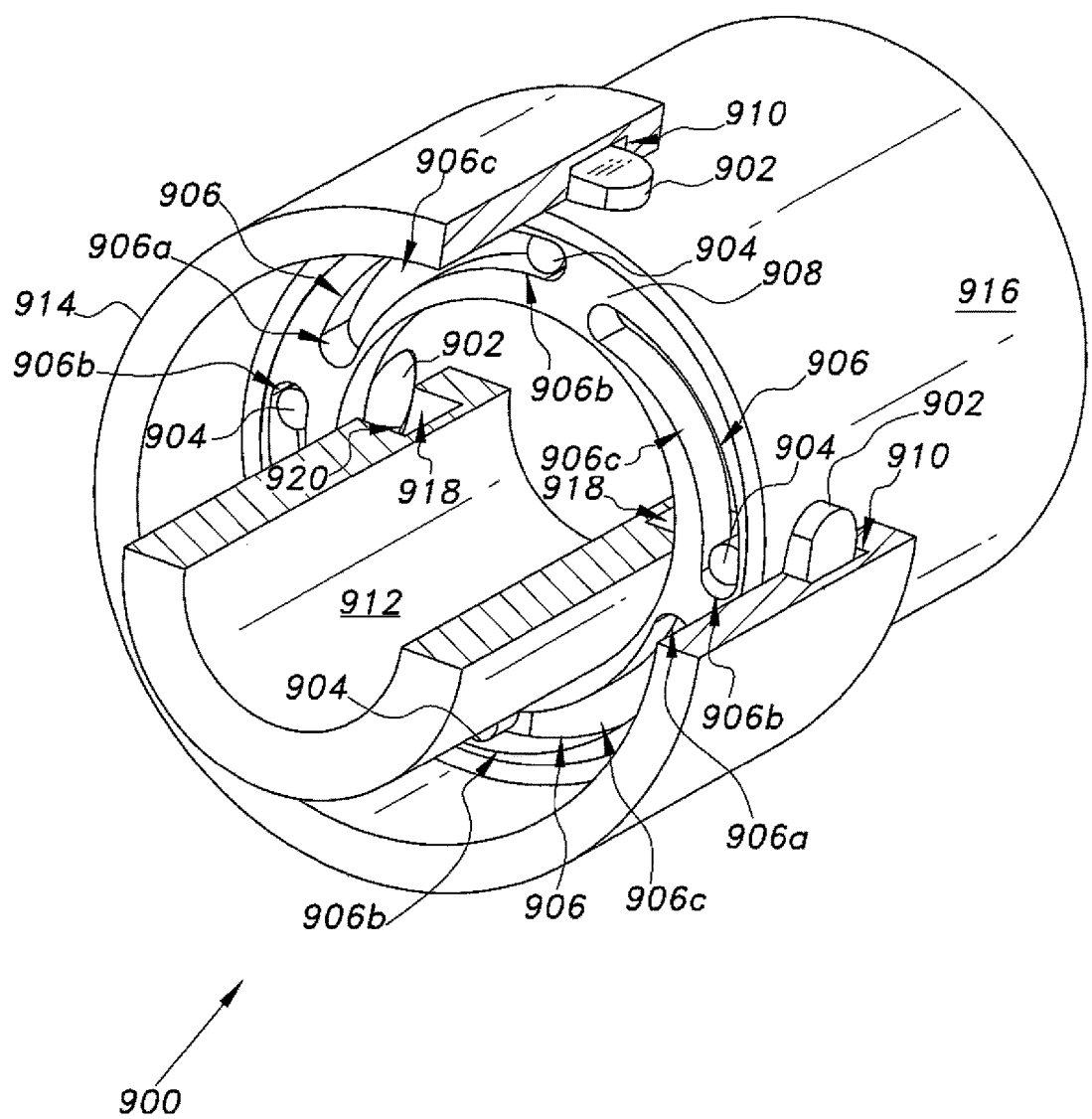
FIG. 11B is a perspective view of the embodiment of FIG. 11A of the radially engaging coupling system according to the present invention showing the inner and medial components of the system disengaged and the medial and outer components engaged, with a portion of the structure shown removed for clarity.

Still another embodiment, designated as coupling system 900, is illustrated in FIGS. 11A and 11B. The coupling system 900 differs from other embodiments described herein by having three concentric cylindrical components, rather than two, as described in other embodiments (although those other embodiments may be modified in accordance with the coupling system 900 embodiment of FIGS. 11A and 11B to have three concentric cylindrical components as well).

The coupling system embodiment 900 of FIGS. 11A and 11B has a plurality of radially disposed bolts 902, with each having a pin 904 extending laterally therefrom. The bolt pins 904 engage corresponding pin passages 906 disposed through the ring 908. In the embodiment 900 of FIGS. 11A and 11B, the inner and outer pin passages 906a and 906b of each passage 906 are joined by Archimedean spiral slots 906c to provide a continuous path of travel for the bolt pins 904 when the ring 908 is rotated relative to the inner case 912, outer component 914, and mutually coaxial medial component or sleeve 916.

The bolts 902 are distributed radially about the ring 908, in corresponding bolt passages 920 formed through the medial component or sleeve 916. Due to the continuous, smooth Archimedean spiral slots 906c extending between the inner and outer pin passages 906a and 906b in each pin passage 906, it is not necessary to remove the ring 908 in order to reposition the bolts 902. Rather, the ring 908 may be rotated in the medial component or sleeve 916 in which it is coaxially seated to cause the bolt pins 904 to ride along the spiral portions 906c of the passages 906, thereby extending or retracting the bolts 902 into or out of the receptacles 910 formed in the outer case 912 or receptacles 918 formed in the inner case 912.

The extension or retraction of the bolts 904 will be seen to result in the engagement of the bolts 904 with either the inner case 912 or the outer component 914, but not with both simultaneously. In FIG. 11A, the bolts 904 are shown in their inwardly retracted state where they engage bolt receptacles 918 of the inner case 912, but are completely retracted from the bolt receptacles 910 of the outer component 914. Rotation of the ring 908 in a counterclockwise direction from the position shown in FIG. 11A results in the condition or state illustrated in FIG. 11B, with the bolts 902 extended outwardly to engage the bolt receptacles 910 of the outer component 914 while retracting them completely from the inner case 912. An intermediate positioning of the ring 908 may result in the bolts 902 engaging both the outer component 914 and the inner case 912, depending upon the depths of their respective bolt receptacles 910 and 918 and the lengths of the bolts 902.

Figure 12:
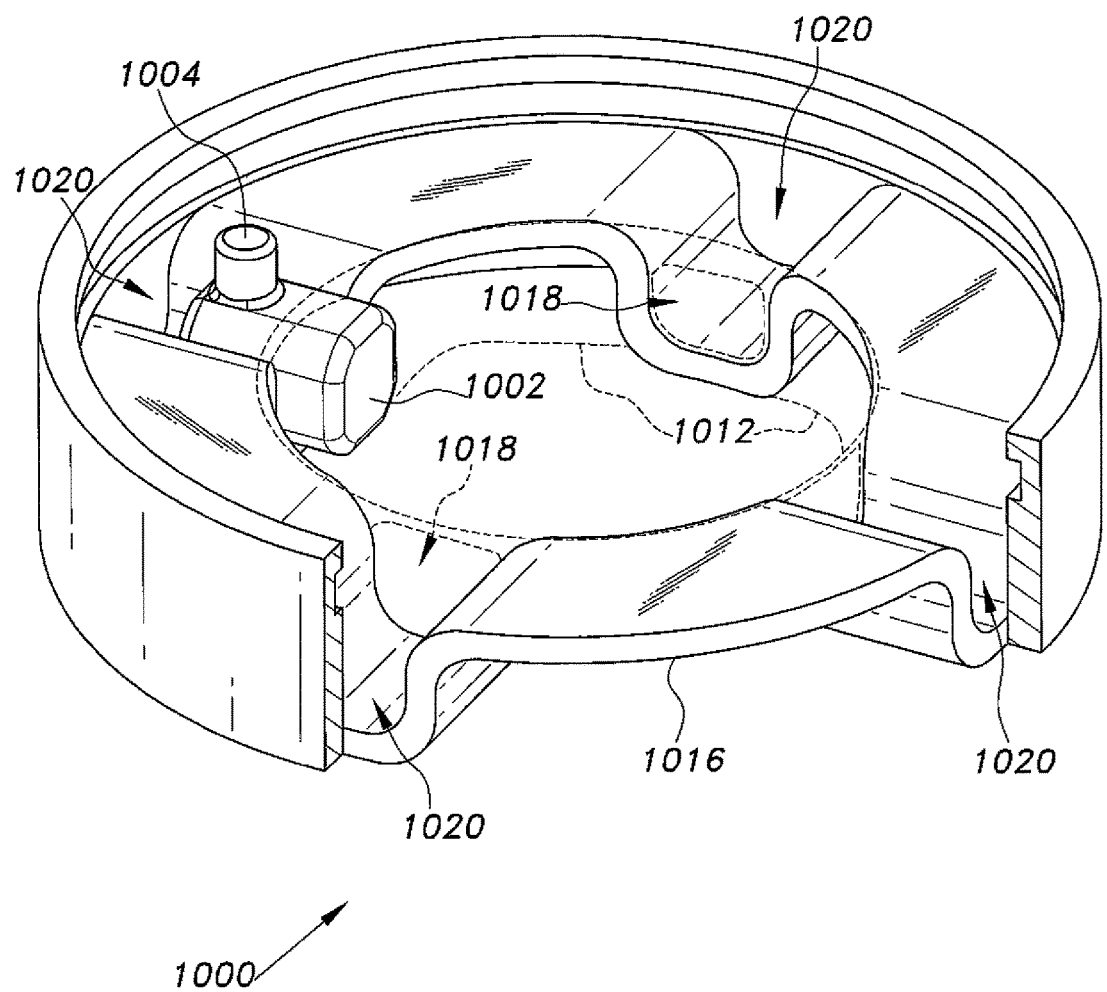
FIG. 12 is a perspective view of a tenth embodiment of the radially engaging coupling system according to the present invention, with a portion of the structure shown removed for clarity.

Finally, FIG. 12 provides a simplified, partially broken away perspective view of a further embodiment of the radially engaging coupling system, designated as coupling system 1000. The coupling system 1000 operates in much the same manner as described for other embodiments described further above, i.e., rotation of a ring (not shown in FIG. 12) engaging bolt pins 1004 results in the radial extension or retraction of one or more bolts 1002 from or into corresponding bolt passages 1018 in a concentric component, in this case an inner casing 1012 (shown in broken lines in FIG. 12). The salient feature of the embodiment 1000 of FIG. 12 is the carrier or bolt holder 1016 for the bolts 1002. In the embodiment 1000 of FIG. 12, the bolts 1002 are carried in a medial bolt holder 1016 comprising a stamped (or otherwise formed) sheet of material. Bolt channels or receptacles 1020 are stamped (or otherwise formed) in the circular bolt holder sheet 1016, with the bolts 1002 residing in those channels or receptacles. The assembly is housed within a concentric or coaxial outer component 1014. This configuration may be adapted to other embodiments of the radially engaging coupling system described further above, as practicable.

It is to be understood that the present invention is not limited to the embodiments described above, but encompasses any and all embodiments within the scope of the following claims.

We claim:

1. A radially engaging coupling system, comprising:
a plurality of radially disposed bolts;
a pin extending laterally from the each of the radially disposed bolts thereby defining a bolt pin;
at least one ring having a plurality of inner pin passages and a plurality of outer pin passages disposed therein, wherein the number of inner and outer pin passages corresponding to the number of bolts, each of the bolt pins being adjustably positioned in a corresponding inner pin passage of the ring to secure the bolt in a retracted state or in a corresponding outer pin passage of the ring to secure the bolt in an extended state, wherein each of the inner pin passages and corresponding outer pin passages of the ring are joined by a continuous circumferential Archimedean spiral slot extending therebetween, further wherein each of the terminal portions of the Archimedean spiral slot defines a non-Archimedean slot locking portion for the bolt pin at the outer pin passage; and
an outer component concentrically surrounding the at least one ring, the outer component having an inner surface with a plurality of closed end receptacles therein, the number of receptacles corresponding to the number of bolts, the bolt configured to releasably engage the receptacle of the outer component to lock the outer component to the ring when the bolt is in an extended state and release the outer component from the ring when the bolt is in a retracted state.

* * * * *